UNITED STATES PATENT OFFICE.

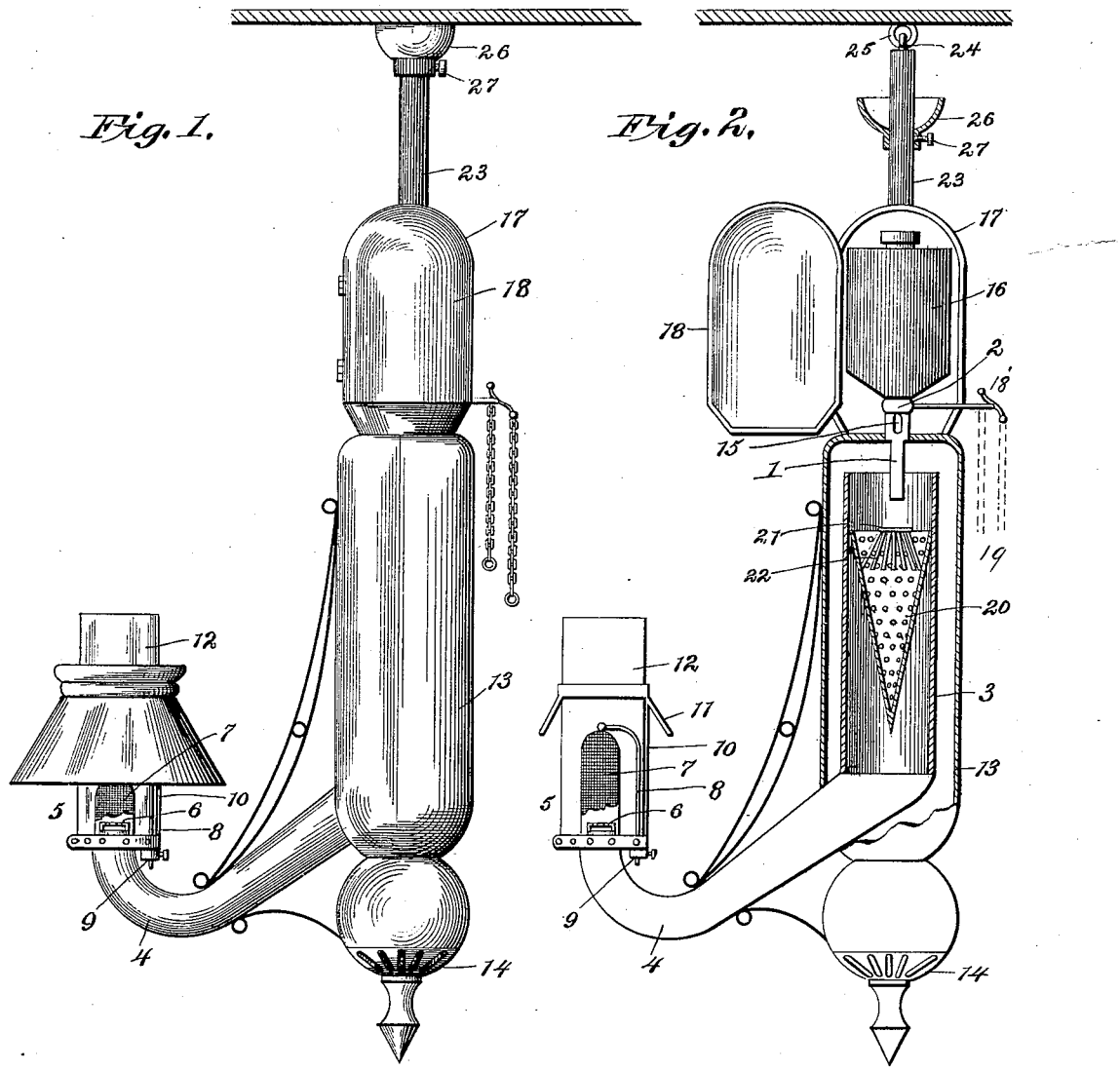

GEORGE C. CALENTINE AND STEPHEN D. LUDLOW, OF OMAHA, NEBRASKA, ASSIGNORS, BY DIRECT AND MESNE ASSIGNMENTS, TO THE PERFECTION INCANDESCENT GAS LAMP COMPANY, OF SAME PLACE.

CARBURETING-LAMP.

SPECIFICATION forming part of Letters Patent No. 648,682, dated May 1, 1900.

Application filed June 24, 1898. Renewed May 19, 1899. Serial No. 717,482. (No model.)

*To all whom it may concern:*

Be it known that we, GEORGE C. CALENTINE and STEPHEN D. LUDLOW, residing at Omaha, in the county of Douglas and State of Nebraska, have invented certain useful Improvements in Carbureting-Lamps; and we do hereby declare that the following is a full, clear, and exact description of the invention, such as will enable others skilled in the art to which it appertains to make and use the same, reference being had to the accompanying drawings, which form a part of this specification.

Our invention relates to vapor-lamps, and has for one object to provide a lamp adapted for using gasolene or other hydrocarbon oil as a fuel wherein the vaporization of the fuel by heat may be avoided, but wherein such vaporization is accomplished by passing a current of air over the fuel while in a distributed condition to enable the air to take up a sufficient quantity of the vapor and to carry the same in a thoroughly-intermingled condition to the burner to produce a highly-inflammable and practically-colorless light for use in connection with an incandescing or illuminating mantle. It is a desideratum in devices of this class to provide a portable apparatus of compact arrangement wherein is contained the reservoir which supplies the fuel and which may be replenished at intervals, and particularly to provide such an arrangement of parts as to insure the communication of a large volume of air to the burner as compared with the quantity of fuel-vapor, owing to the fact that the use of the incandescing mantle insures the production of a brilliant light with a comparatively-small quantity of fuel, provided the combustion is perfect.

Further objects and advantages of this invention will appear in the following description, and the novel features thereof will be particularly pointed out in the appended claims.

In the drawings, Figure 1 is a side view of a lamp constructed in accordance with our invention. Fig. 2 is a vertical sectional view of the same.

Similar reference characters indicate corresponding parts in both figures of the drawings.

Our invention embodies, essentially, a feed-tube 1, preferably having a graduating or controlling valve or cock 2, which may be of any preferred construction, an open-ended vaporizing-chamber 3, containing fuel-distributing devices and constructed and arranged to provide for causing a current of air, preferably in a downward direction, therethrough to take up fuel-vapor, and a burner-tube 4, communicating with one end of the vaporizing-chamber and extending to a burner 5, substantially of the ordinary construction. The burner which we have illustrated in the drawings embodies a perforated burner-cap 6, fitted to the end of the burner-tube 4, which may be of any shape or configuration to suit the location and use of the lamp, an incandescent mantle 7, fitted at its lower end over said cap and upheld by the usual adjustable supporting-rod 8, which is fitted at its lower end in an exteriorly-accessible socket 9, a gallery 10, having the usual shade-brackets 11, and the chimney or globe 12, supported by the gallery.

The vaporizing-chamber 3, which is preferably elongated vertically and may be of cylindrical form, as shown, is open at its upper end for the access of air, while its lower end is in communication with the conveyer by which the vapor is carried by a column of air to the burner, and the drip-tube or feed-tube 1 extends downward into said vaporizing-chamber to a point below the upper end thereof, whereby air in entering the vaporizing-chamber passes downward through the annular space between the drip-tube and the walls of the cylindrical chamber. It is desirable also to provide means for regulating the rapidity of the influx of air to the vaporizing-chamber, and hence we preferably employ an air valve or register which may be adjusted from a point outside of the lamp to secure the entrance of a quantity of air which is just sufficient to support the combustion of the vaporized fuel and insure a colorless flame at the burner-cap. It is also desirable in a lamp which is designed for interior use to provide a more or less ornamental and finished exterior appearance, and therefore in the lamp which we have illustrated in the drawings (and which is designed for indoor use in contradistinction to those lamps which may be used for furnishing street-lights) the vaporizing-chamber 3 is inclosed within a casing 13, which may be of any desired cross-sectional shape, but of which the walls are spaced from the adjacent walls of the vaporizing-chamber to form an annular space or passage which at its upper end communicates with the interior of the vaporizing-chamber. The burner-tube or conveyer 4 extends from the lower end of the vaporizing-chamber through the side wall of this casing, and the latter preferably extends below the plane of said burner-tube and is fitted at its extremity with an air valve or register 14. Thus the air which is to act as a vehicle and combustion-supporter for the fuel-vapor must enter the casing at its lower end through the inlet-openings controlled by the air valve or register, and thence must pass upward between the walls of the vaporizing-chamber and the casing to the upper end of said chamber, and finally downward through the vaporizing-chamber, where it takes up the fuel-vapor, and to the burner. This arrangement of parts not only insures compactness and a more or less ornate exterior appearance, but arranges the air valve or register at the lowermost point of the lamp, where it may be readily reached for adjustment. Also, as indicated in the drawings, that portion of the casing which depends below the laterally-extending burner-tube may be made of ornamental exterior configuration to give a finished appearance to the structure.

The drip or feed tube extends downward from a point above the upper closed end of the casing, through said closed end, and thence downward into the upper end of the vaporizing-chamber, it being desirable to liberate the fuel at a point sufficiently removed from the upper end of the vaporizing-chamber to insure the proper downward conveyance of all vapor which may emanate therefrom, and in the feed-tube, above the plane of the top of the casing, is preferably set a glass or other transparent inspection-panel 15, arranged below the regulating-valve 2, whereby the operator may ascertain the rapidity of flow of the fuel to the vaporizing-chamber. Seated upon the upper end of the feed-tube, above the plane of the regulating-valve, is a fuel reservoir or tank, consisting of a can 16, which may be of any preferred construction and which, particularly in a lamp designed for indoor use, is inclosed in an auxiliary reservoir-casing 17, having a side opening fitted with a door 18 to facilitate the introduction and removal of the reservoir for filling and other purposes. This opening in the side of the auxiliary casing, which preferably rises from the top of the main casing 13, may extend downward to the plane of the top of the main casing, whereby when the door is opened the inspection-panel is within view of the operator. Also the regulating-valve is preferably provided with a laterally-extending stem 18', projecting through the side wall of the auxiliary casing and fitted with arms, to which are connected operating-chains 19.

The vaporizing devices which we have shown in connection with the vaporizing-chamber consist of a perforated or reticulated distributing medium 20, arranged below the feed-tube and in the path of liquid fuel dropped therefrom, and above this distributing medium is arranged a small disk 21, forming a splash-plate, upon which the liquid drops and by which it is distributed to the adjacent portions of the medium 20. This splash-plate, particularly in connection with an inverted conical distributing medium such as that shown in the drawings, is supported in the base or large end of the cone by means of upwardly-convergent rods 22, which serve the additional function of carrying the liquid from the splash-plate to the different portions of the surface of the distributing medium. Also in the construction illustrated the base of the inverted conical distributing medium is of a size adapting it to fit snugly in the bore of the cylinder forming the vaporizing-chamber, whereby all of the air which enters the chamber at its upper end must pass through the perforations or openings in the distributing medium, and thus must be brought into intimate contact with the fuel which is distributed upon said medium to insure the taking up of the necessary amount of vaporized fuel to produce an inflammable mixture. Furthermore, the illustrated shape of the distributing medium is such as to cause the air to be deflected as it passes through the medium, whereby it is brought into efficient contact with the fuel in its passage.

As an auxiliary feature of the construction illustrated, we employ a suspending-stem 23, which rises from the top of the auxiliary casing 17 and terminates in a hook 24 for engagement with a suspending-ring 25, and fitted for adjustment upon the stem is a canopy or inverted bell 26, held in place by a set-screw 27 and adapted to be arranged at the upper end of the stem to inclose the interlocked hook and ring and bear at its edge against the ceiling or other surface in which the ring is secured to hold the stem fixed in a vertical position, thereby preventing swinging or vibration of the lamp.

It is to be observed that the lamp of our invention includes as a primary feature thereof a bent or irregularly-shaped tube having its two ends upwardly turned, one end of said tube extending some distance above the other end, and said long end being of considerably-greater cross-sectional area for the purpose of providing a vaporizing-chamber therein, the shorter end of the tube carrying or supporting an incandescent burner. This doubled or bent tube supports within the end forming the vaporizing-chamber, a funnel and splash-plate which constitute the vaporizing device from the fact that the liquid hydrocarbon is dropped upon the splash-plate in a manner to be diffused over the surface of said plate and the funnel, and thus air which is drawn through the vaporizing-tube and the vaporizing device is brought into intimate contact with the diffused liquid hydrocarbon, so that the air will be carbureted as it traverses the vaporizing-tube, without, however, subjecting the air to the heat from the incandescent burner.

The lamp of our invention embodies two primary features—namely, an arrangement of the vaporizing-chamber forming a part of the bent or doubled vaporizing-tube having the air-inlet port and the oil-supply mechanism so arranged as to secure the passage of an air-current and the liquid hydrocarbon through the vaporizing-chamber in one and the same direction for the purpose of mechanically combining the diffused liquid hydrocarbon with the air-current, and, secondly, the burner-tube itself supports at its short lower end an incandescent burner which receives the carbureted vapor from the doubled tube. This burner when in service promotes or induces the circulation of the carbureted vapor through the vaporizing-chamber, and said burner is limited to draw its supply of carbureted air to support combustion from the vaporizing-chamber of the tube, whereby a relatively-large volume of air will be drawn by the action of the burner through the air-inlet port of the vaporizing-chamber, so that all the air supplied to the incandescent burner must traverse the vaporizing device and the vaporizing-chamber.

Thus it will be seen that there has been provided a lamp in which the parts are compactly arranged and in which the fuel of the lamp may be vaporized outside of the zone of heat of the burner and that such vapor is presented to the burner mixed with a suitable proportion of air to produce an effective flame. Also, it will be seen that the air introduced into the vaporizing-chamber is brought into contact with the fuel at a time when the latter is thinly distributed over a large area, resulting in a quick and complete vaporization. It will be understood, furthermore, that various changes in the form, proportion, size, and minor details of construction within the scope of the appended claims may be resorted to without departing from the spirit or sacrificing any of the advantages of the invention.

Having described our invention, what we claim is—

1. In a vapor-lamp, the vaporizing-chamber to which air is admitted, the inverted conical perforated distributer, having its upper end fitted closely in said vaporizing-chamber, the splash plate or disk 21, located centrally in the upper end of the said distributer and forming an annular air-passage between said splash plate or disk and said distributer, and the feed-rods 22 leading from said splash plate or disk to the interior surface of said distributer, and extending across said annular air-passage, in combination with a reservoir or other source of hydrocarbon, having a drip apparatus above said splash plate or disk, and a burner-tube communicating with said vaporizing-chamber, substantially as described.

2. In a carbureting-lamp, the combination of a suitable casing, a valved reservoir movably secured to said casing, a drip-tube extending from said reservoir into said casing, an air-valve at the lower end of said casing and disposed beyond the zone of influence of the lamp-burner, an open-ended cylinder of a diameter less than and positioned within said casing, a burner-pipe extending from the lower end of said cylinder through the wall of said casing at a point above the air-valve and provided with an incandescent burner at a point remote from said casing, a perforated cone positioned, apex downward, within and near the upper end of said cylinder, a splash-plate positioned within the upper end of said perforated cone, below said drip-tube, arms radiating from said splash-plate and secured to said perforated cone, and a perforated cap at the open end of said pipe, all arranged substantially as and for the purpose set forth.

3. In a carbureting-lamp, the combination of a housing, 17, a main housing, 13, secured to the lower end of said housing, 17, a valved reservoir, 16, within said housing, 17, a drip-tube 1 extending from said reservoir into said main housing, 13, an air-valve, 14, within the lower end of said main housing, 13, a cylinder, 3, within said main housing, a burner-tube, 4, extending from said cylinder, said burner-tube being provided with a burner at its end remote from the casing, a perforated inverted cone, 20, positioned within said cylinder, 3, the radiating arms, 22, within said cylinder, and the splash-plate, 21, secured to said arms within the upper end of the cone, substantially as specified.

4. In a lamp, the combination, with a casing provided with a door and means for suspending it in a vertical position, of a feed-receptacle therein, the bottom of which is provided with a tube and projects below said casing, a valve in said tube, the outer end of the stem of which projects through the casing and is provided with means for rotating it, a vaporizing-tube, one end of which is below the feed-receptacle and is provided with a vaporizer, and the other end is provided with an incandescent burner.

5. In a lamp, the combination, with a substantially-cylindrical casing, the lower end of which is contracted and provided with a slotted spherical portion, of a vaporizing-tube projecting through the side of said casing above said spherical portion, the outer end of which is provided with an incandescent burner and the inner end is provided with a vaporizer, and means for feeding oil to said vaporizer.

6. In a lamp, the combination, with a substantially-cylindrical casing, each end of which is annularly contracted and the upper portion is formed into a separate compartment and the lower end is formed into a slotted sphere, of a vaporizing-tube projecting through the side of the casing above the sphere, the outer end of which is provided with an incandescent burner and the inner end is provided with a funnel-shaped vaporizer, a splash-plate in the vaporizer comprising a flat portion and a series of radial arms extending therefrom to the vaporizer below its upper edge, and a feed-receptacle within the upper compartment, the bottom of which is provided with a valved feed-tube which projects into the lower portion of the casing and terminates intermediate the top of the vaporizing-tube and the splash-plate.

7. In a lamp, the combination, with a substantially-cylindrical casing, the lower end of which is provided with a slotted spherical portion, of an inclined vaporizing-tube projecting through the side of the casing above the spherical portion, the outer end of which is curved upward and provided with an incandescent burner and the inner end is bent at an angle and extends upwardly within the casing to near its upper portion, a vaporizer within the top of the vaporizing-tube provided with a splash-plate, and a feed-receptacle, the outlet of which is above the splash-plate and below the top of the vaporizing-tube.

In testimony whereof we have affixed our signatures, this 15th day of June, 1898, in the presence of two witnesses.

GEORGE C. CALENTINE.
STEPHEN D. LUDLOW.

Witnesses:
EDWARD REITER,
GEORGE W. SUES.